United States Patent Office 3,548,183
Patented Dec. 15, 1970

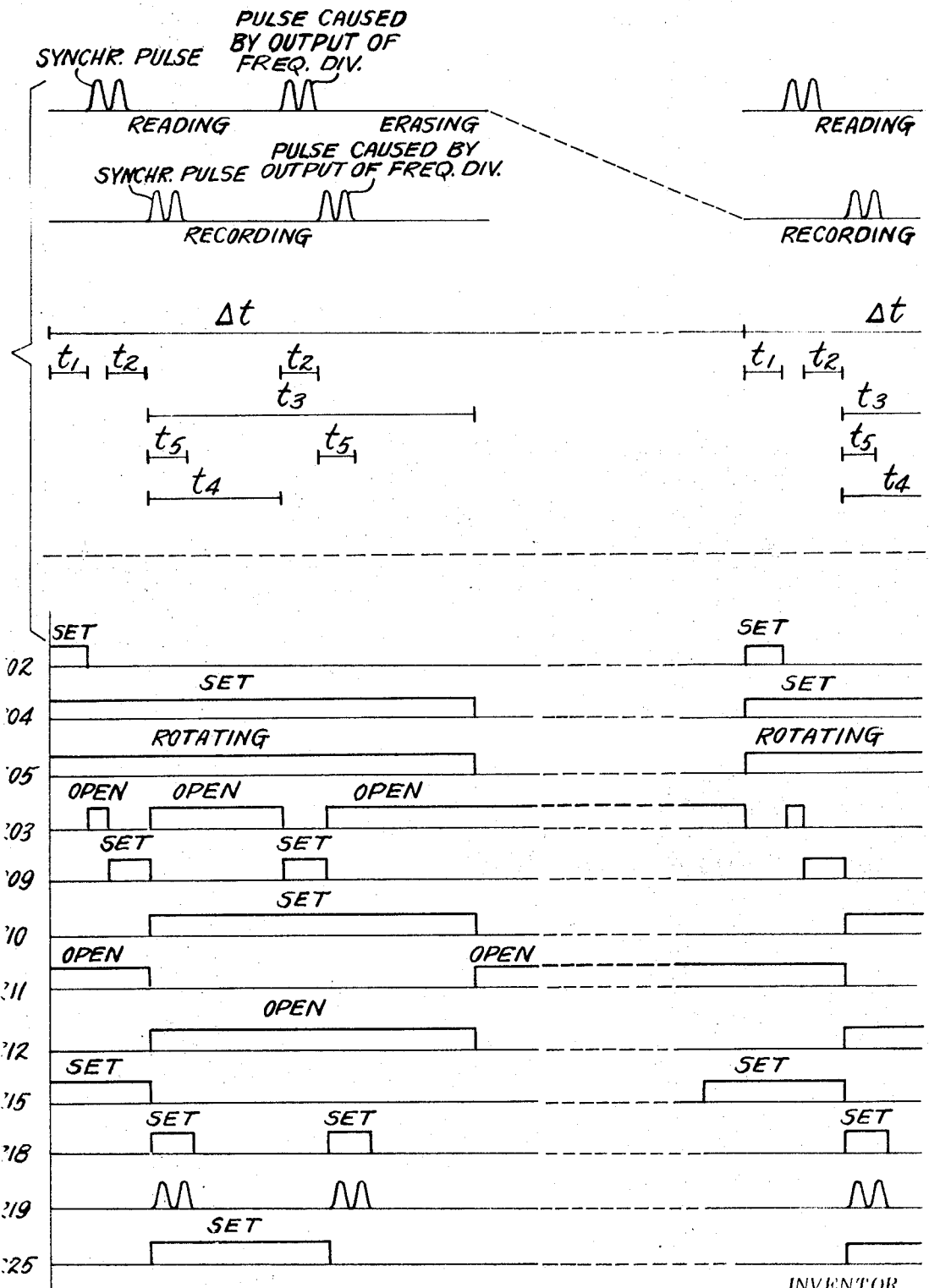

3,548,183
METHOD OF INTEGRATING OVER A FLOATING INTERVAL AND APPARATUS COMPRISING A MAGNETIC TAPE FOR CARRYING OUT THIS PROCESS
Philippe Jouve, Pontacq, France, assignor to Societe Nationale des Petroles d'Aquitaine, Courbevoie, Hauts-de Seine, France
Filed July 22, 1968, Ser. No. 746,517
Claims priority, application France, July 28, 1967, 116,167
Int. Cl. G06f 7/46; G06g 7/18
U.S. Cl. 235—183
4 Claims

ABSTRACT OF THE DISCLOSURE

The method of integrating a value of variable magnitude over a floating period of time, which comprises the steps of transforming said magnitude into electrical pulses proportional in frequency to said magnitude, dividing this frequency by a predetermined constant number, recording the pulses on successive zones on an endless movable magnetic tape, counting the pulses directed to the tape in a counter, and substracting the pulses stored during the previous revolution of the tape from the total of pulses recorded in the counter. Recording and reading of the pulses on the tape and stopping of the tape are initiated by a synchronizing pulse on each zone of the tape. The invention also comprises a device for carrying out said method.

---

Figure 1:
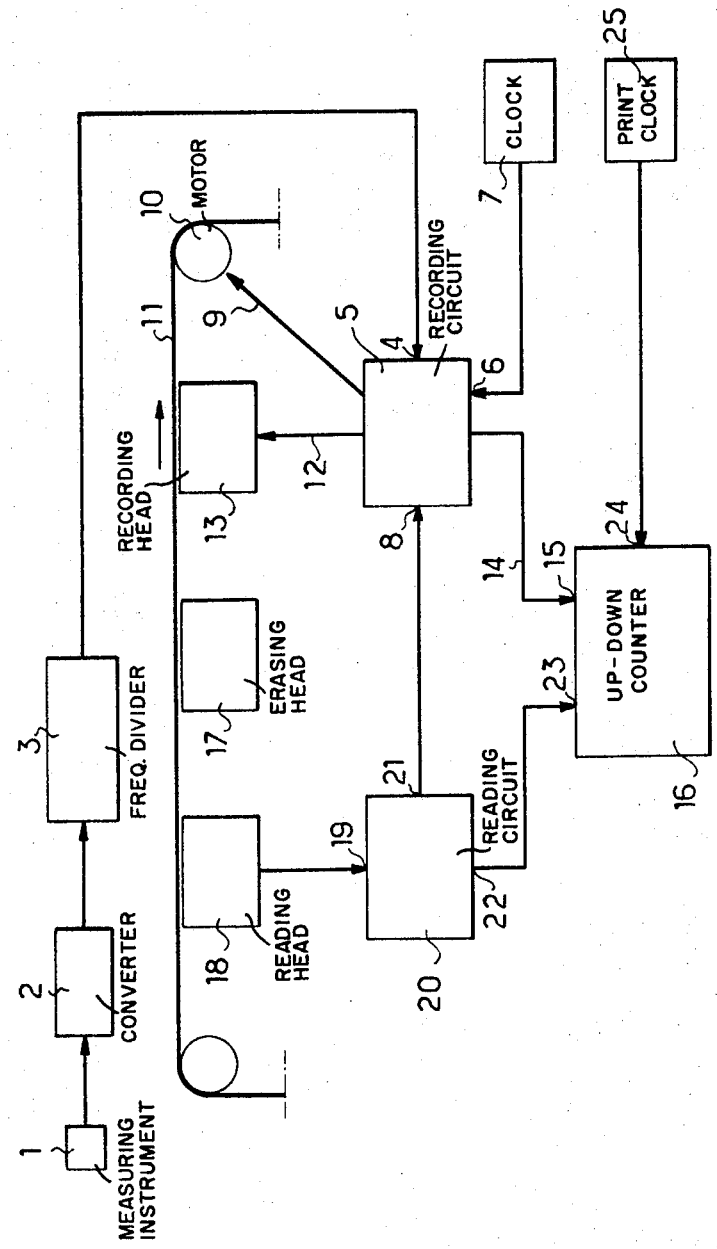

Calculators are now in use which integrate a signal of variable magnitude over a floating interval, that is to say, over a constant interval preceding the instant at which the value of that integral is to be detected and hereinafter referred to as a "floating interval."

This type of integration is particularly useful for measuring the quantity of fluid flowing through a passage, and in particular in the gas meter industry, in which it is necessary to know, at any given moment, the quantity of gas which has been supplied during a number of hours preceding the detection, so that a bill may be rendered.

The present invention relates to a new method of integrating over a floating interval which makes it possible to calculate the integral with respect to time of a signal of slowly changing magnitude over a constant period of time, during which interval the information collected is recorded in a memory.

It is an object of the present invention to provide a new method of integrating a signal of variable magnitude with respect to time, over a floating interval, in which the signal to be integrated is transformed into a succession of pulses, the frequency of which is at each instant proportional to the magnitude of the signals to be integrated, characterized by the fact that this frequency is divided by a constant number so selected that the maximum value of the integral to be detected and represented by a certain number of pulses over the floating interval is no greater than the storage capacity of the memory. This selection is made before the apparatus is put into use by determining the number of stages of the frequency divider so that the interval of time separating the two closet pulses leaving the frequency divider, which correspond to the maximum value of the signal to be measured, is at least equal to the passage time of a memory unit as hereinafter defined. The pulses coming from the frequency divider cause storing of a signal, respectively, in a memory bank comprising N individual memory units, which pass successively at equal intervals of time before a reading unit which reads and records the signals at a speed such that all of the N memory units are read during the floating interval. The signals withdrawn from the individual memory units are constantly subtracted from the total number of signals recorded in the memory bank, so that the resulting total number may be proportional to the integral over the interval of integration by simply reading all the signals which have been thus obtained at the moment under consideration.

The interval of integration may be defined as the floating interval divided by the number of individual memory units.

In a preferred method of carrying out the process according to the invention the signals, which correspond to the pulses delivered by the frequency divider, are fed to a memory bank consisting of an endless magnetic tape, in which each of the N memory units corresponds to a zone on said endless magnetic tape.

In accordance with the invention the magnetic tape is passed in front of a sensor consisting of a reading head, erasing means, and a recording head, and each signal, which corresponds to a pulse delivered by the frequency divider and which consist of a single electrical pulse or a train of electrical pulses, is recorded in the zone of the tape in front of the recording head, while at the same time it is determined whether the zone on the tape which lies just ahead of the zone in front of the recording head has recorded, a signal during the preceeding floating interval.

In a preferred method of carrying out the process according to the invention, the pulses from the frequency divider are positively recorded in an up-down counter while the signals which may be read at the reading head are subtracted in the same up-down.

In accordance with the invention a clock controls the movement of the magnetic tape past the reading head at equal intervals of time.

In one particular method of carrying out the process according to the invention the beginning of each zone of the endless magnetic tape corresponding to a single memory unit, in formed by a recorded synchronizing pulse which, at the moment at which it is read by the reading head causes recording of a new synchronizing pulse which may be followed by the signal stored in an intermediate memory by means of the pulse from the frequency divider. For this purpose the magnetic tape may be formed as a closed loop the length of which is determined to permit exactly one revolution of the loop during the "floating interval," i.e., the integration interval.

In accordance with the invention, the total number of pulses recorded in the up-down counter is detected at regular intervals. This number is proportional to the integral of the signal of variable magnitude measured during the preceding floating interval.

It is a further object of the present invention to provide apparatus for carrying out the invention which comprises: means for transforming a magnitude to be integrated into electrical pulses having a frequency proportional to said signal, characterized by the fact that it also comprises a frequency divider for dividing the frequency of the electrical pulses by a number such that the maximum value of the integral corresponds at most to the capacity of the memory, a continuous magnetic tape, and a sensor comprising a reading head, an eraser, and a recording head; an up-down counter for counting electrical pulses; a clock which supplies an electrical pulse at regular intervals which causes the magnetic tape to advance beneath the sensor; a recording logic circuit capable of indicating immediately after it has received a synchronizing pulse whether it has received a pulse from the frequency divider, so as to record a corresponding pulse on the magnetic tape and add it into the up-down counter; a reading head capable of detecting on the magnetic tape a pulse which may have been recorded thereon a floating interval previously and capable of transmitting it to the up-down counter to be subtracted from the total thereon.

In a preferred embodiment of the invention the recording circuit comprises a bistable operating as a memory to store the pulse received from the divider and reproducing it when a synchronizing pulse from the reading circuit is applied thereto.

In a particular embodiment of the invention, the recording circuit transmits the synchronizing pulse and a pulse received from the divider and stored in the bistable to the recording head with a constant difference of time through a suitable circuit of monostables and gates.

In a preferred embodiment of the invention, the reading circuit comprises a series of gates and monostables so arranged that the synchronizing pulse prepares the recording circuit when the pulse delivered by the bistable which will succeed it is transmitted to the up-down counter.

Figure 2:
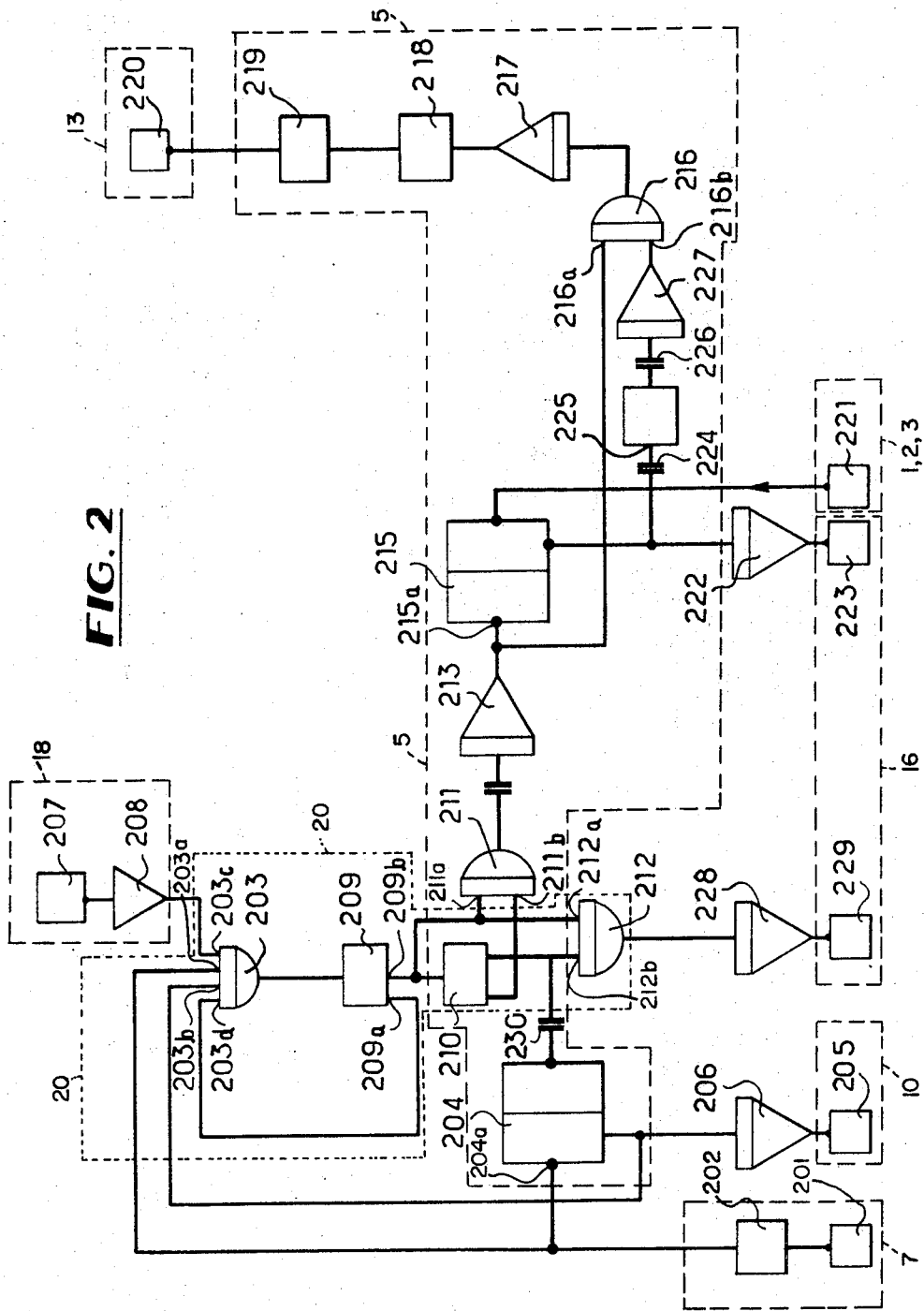

In order that the process and apparatus according to the invention may be better understood, one embodiment thereof will now be described, purely by way of example, with reference to the accompanying drawings, in which:

FIG. 1 diagrammatically illustrates how the process according to the invention is carried out, and FIG. 2 is a circuit diagram showing the circuit of FIG. 1 in detail. FIG. 3 is a diagram illustrating the states of different elements of the circuit of FIG. 2 during the operation.

FIG. 1 shows a measuring instrument 1 for measuring the value of variable magnitude. The signal furnished by the measuring instrument 1, which may be a voltage or a current, is converted by a converter 2 into electrical pulses, the frequency of which is proportional to the magnitude of value measured by the instrument 1.

The output of the converter 2 is applied to a frequency divider 3 which is adjusted so that the maximum number of pulses obtained at the output of the divider during a unit of time when the value to be measured is a maximum does not exceed the storage capacity of the continuous magnetic tape, i.e., the frequency divider delivers at most one pulse to a memory unit. As mentioned before, the tape forming a closed loop, which makes a complete revolution during a floating interval, is divided into a number of memory units or zones. Each of these zones can store a pulse delivered by the frequency divider during an interval of time $\Delta t$, which interval is equal to the floating interval divided by the number of zones on the tape. A pulse delivered during the following interval of time $\Delta t$ will be stored in the following zone. Therefore, the maximum storage capacity is reached, when a pulse is delivered during each interval of time $\Delta t$, so that a pulse is stored in each zone, or when the interval of time between the two closest pulses is at most equal to the interval of time $\Delta t$, because a shorter interval between the pulses would cause the loss of one pulse.

The pulses delivered by the divider 3 are transmitted to the input 4 of a recording circuit 5. This circuit also receives at its input 6 a pulse emitted at time intervals corresponding to $\Delta t$ by a clock 7. The recording circuit 5 also receives synchronizing pulses at its input 8. The circuit 5 controls a motor 10 through a connection 9. This motor drives the magnetic tape 11 during a fraction of each interval of time $\Delta t$. The circuit 5 transmits the signals, namely the synchronizing pulse and a pulse delivered by the divider 3, through a connection 12 to a recording head 13 to record them on the magnetic tape 11. Finally the circuit 5 transmits the output pulses from the divider 3 through a connection 14 to the input of the up-down counter 16.

Reference numeral 18 indicates the reading head which picks up such recorded information and transmits it to the input 19 of a reading circuit 20. The output 21 of the reading circuit is connected to the input 8 of the recording circuit to transmit the synchronizing pulses thereto, while the output 22 of the reading circuit 20 is connected to the input 23 of the up-down counter 16 subtracts or counts down the pulses received from the divider 3 which have been recorded on the magnetic tape during the preceding floating interval. Reference numeral 17 designates an erasing head for erasing the information stored on the magnetic tape before moving the corresponding part of the tape to the recording head 13.

A control input 24 of the up-down counter 16 is connected to a clock 25 capable of controlling the printing of the total recorded in the up-down counter at predetermined intervals of time.

The magnetic tape 11 is divided into as many individual memory zones as there are intervals of time $\Delta t$ in the floating interval $\theta$. This is achieved by recording synchronizing pulses, which may consist of a single pulse or a train of pulses, respectively, on the tape. The front edge of a synchronizing pulse characterizes the beginning of a zone, which ends at the front edge of the following synchronizing pulse. For the grst time, these synchronizing pulses dividing the complete tape are recorded before putting the apparatus into operation.

Therefore a synchronizing pulse is recorded at the beginning of each of these zones before it reaches the reading head. At the beginning of each elementary interval of time $\Delta t$ the endless tape starts moving so that the zone directly before the reading head passes over the reading head 18 while the preceding zone moves over the recording head 13. Then the tape is stopped and kept in this position till the end of the interval of time $\Delta t$.

The synchronizing pulse recorded on the magnetic tape at the beginning of the zone which is about to pass in front of the reading head 18 is transmitted by the reading circuit 20 to the recording circuit 5, and a pulse caused by the output of the frequency divider 3 which pulse may have been recorded in this zone at an interval of time $\theta$ (floating interval) therebefore, is supplied to the subtracting input 23 of the up-down counter 16. The zone of the magnetic tape preceding the one passing in front of the reading head passes in front of the recording head 13 after having been erased by the erasing head 17. The recording circuit retransmits to the recording head 13 a synchronizing pulse caused by the synchronizing pulse at the beginning of the previous zone which has been sensed by the reading head 18 and has caused transmitting of a signal from the reading circuit 20 to the recording circuit 5 through line 21–8.

The synchronizing pulse also causes a pulse delivered by the frequency divider 3 which has been stored in the recording circuit 5 during the preceding interval $\Delta t$ to be recorded in the zone passing over the recording head 13, and to be added at the input 15 of the up-down counter 16.

It will thus be seen that during each interval of time $\Delta t$ if a pulse it is delivered by the divider 3, this will be not only recorded on a zone of the magnetic tape, but also added in the up-down counter 16. During this same time $\Delta t$ the zone of the endless magnetic tape 11 which passed over the recording head 13 a time $\theta$ (floating interval) previously is sensed by the reading head 18 by means of the reading circuit and counted negatively, that is to say, any pulse which has been delivered by the frequency divider 3 and recorded in this zone is subtracted in the up-down counter 16.

Under these circumstances, at any given moment, the up-down counter totalizes the number of pulses which have been delivered by the divider 3 during a time $\theta$ preceding the moment under consideration, because all pulses stored before this time $\theta$ are subtracted during said time $\theta$ so that only those pulses are stored in the up-down counter which have been delivered just during this time $\theta$ under consideration. A clock 25 controls the detection at predetermined intervals of time, preferably at each floating interval, of the number of pulses totalized by the up-down counter, which is proportional to the integral of the magnitude of the value measured by the device 1 over the preceding interval of time $\theta$. It should be noted that the diagram of FIG. 1 only shows a simplified circuit similar to a flow chart and does not contain all connections which may be necessary to control the elements of the circuits represented by rectangles.

FIG. 2 shows a clock 201 which applies pulses to a monostable 202 at regular intervals, namely a pulse during each interval $\Delta t$. This unit delivers a calibrated pulse of time duration $t_1$.

This calibrated pulse is transmitted to the input 203a of a gate 203, at which it serves a blocking function, and to the input 204a of a bistable 204 which controls the advance of the magnetic tape and is set by the pulses from 202.

A signal to advance the tape is caused by the bistable 204 and transmitted to the driving motor 205 for the magnetic tape through an amplifier 206, and to the input 203b of the gate 203.

The gate 203 can open only when it receives a signal to advance the tape, i.e., the output of the bistable 204 caused by setting the bistable, but it is also necessary that the pulse from the monostable 202 shall have ceased. This pulse from the monostable 202 has set the bistable 204 and therefore started the motor 205, so that the gate 203 can open only while the tape is moving and only after the interval of time $t_1$, the duration of the pulse delivered by the monostable 202.

At the beginning of each zone of the magnetic tape corresponding to a single memory unit, synchronizing pulses having a frequency of 1 kc. are recorded. As mentioned before, these pulses are recorded before putting the apparatus into operation. During the operation the synchronizing pulses erased by erasing head 17 are restored by the recording head 13 as described below. The number of waves forming a synchronizing pulse is not critical. It is only necessary that the duration of the entire synchronizing pulse is not greater than $t_2$ as defined below.

The first wave of the synchronizing pulse sensed by the reading head 207 is amplified by a reading amplifier 208 and transmitted to the input 203c of the gate 203, which it passes through, since when it arrives, the tape has already been moving for a time longer than $t_1$.

The first synchronizing pulse then reaches monostable 209 which delivers a calibrated pulse having a duration $t_2$ at its output 209a. This pulse is transmitted to the input 203d of the gate 203 and acts to prevent the other pulses in the train from passing during the time $t_2$ which is a little greater than the length of the train of synchronizing pulses.

The pulse emanating from the output 209b of the monostable 209 is transmitted on the one hand to the monostable 210 which delivers a calibrated pulse over a period of time $t_3$ and on the other hand to the input 211a of a gate 211, to the input 212a of a subtracting gate 212.

When the trailing edge of a pulse from the monostable 209 reaches the monostable 210, the latter delivers a calibrated pulse over a period of time $t_3$ which is applied to the input 211b of the gate 211 to close said gate, and applied to the input 212b of the gate 212, to open said gate.

It follows that the first pulse from the monostable 209 passes through the gate 211 and is differentiated at a condenser 214 and amplifier 213. Its trailing edge actuates a bistable 215 when applied to its input 215a, and a gate 216, or an or-gate when applied to the input 216a of said gate.

The output of gate 216 is differentiated by the amplifier 217 and actuates a monostable 218 which gives a signal authorizing the delivery by an oscillator 219 of a train of pulses having a frequency of 1 kc. and a duration $t_5$, to a recording head 220. This train of pulses recorded on the tape forms the synchronizing signal.

However, the pulse delivered by the amplifier 213 also may reset the bistable 215 which acts as a memory. This memory 215 stores a pulse emitted by a frequency divider 221 which may deliver a pulse during each interval of time $\Delta t$.

If the memory unit 215 has counted a pulse it delivers a pulse because it is reset by a pulse from the amplifier 213. This pulse from the bistable 215 is then transmitted to an amplifier 222 and the adding input 223 of the up-down counter.

The pulse caused by resetting of the bistable memory unit 215 is also transmitted through a condenser 224 to a monostable 225 which delivers a calibrated pulse having a duration $t_4$. This pulse is transmitted through a condenser 226 to an amplifier 227 where it is differentiated. The pulse then created by the trailing edge of the pulse emitted by the monostable over a period of time $t_4$ is transmitted to the input 216b of the gate 216, which is an or-gate, and after passing therethrough actuates the monostable 218 to cause the recording of a second train of pulses having a frequency of 1 kc. and spaced from the train of synchronizing pulses by a distance which corresponds to the movement of the tape during the period $t_4$.

In like manner, at the reading head, if a pulse caused by the output of the frequency divider has been recorded at an interval $\theta$ previously, the pulse will be read at a time $t_4$ after the first synchronizing pulse. This pulse then passes through the gate 203 and actuates the monostable 209, which acts as above described in connection with the reading of the synchronizing pulses. The pulse leaving the monostable 209 finds the gate 211 closed, because the first pulse emitted from the monostable 210 is not yet over, whereas the gate 212 is open. The pulse therefore passes through the gate 212 and an amplifier 228 before reaching, in amplified form, the subtracting input 229 of the up-down counter. A pulse is then subtracted in the up-down counter.

Between the reading and recording heads of the magnetic sensor is an eraser (not shown) which erases the information in the memory unit or zone passing over it.

The trailing edge of the pulse from the monostable 210 is differentiated at a condenser 230 and actuates the bistable 204 to return it to its initial state. In this manner, the instruction to advance the tape is returned to zero and the movement of the tape stopped. The system remains in this state for the remaining part of the period of $\Delta t$ until the next pulse from the clock 201 is received and a new period of time $\Delta t$ begins.

The up-down counter, the adding input of which bears reference numeral 223 and the subtracting input of which bears reference numeral 229 may be coupled to a second clock (not shown) which actuates a printing relay when it is desired to have a graphic representation of the value of the integral over a period of time.

FIG. 3 shows the states of different elements of the circuit of FIG. 2 during a period of time $\Delta t$ and a fraction of the following period $\Delta t$. The magnetic tape is only shown to give an impression of the position of the synchronizing pulses and the pulses caused by the frequency divider in relation to each other. It should be noted that it is indicated in FIG. 3 that the bistable 215, which operates as a memory, is set by a pulse from the frequency divider before the tape is moved again. However, whether this bistable is set or not depends upon the magnitude of the value to be measured.

The process according to the invention and the apparatus for putting it into practice thus make it possible to easily calculate the value of the integral over a floating interval of a value which magnitude varies slowly with respect to time, for a fixed interval of elapsed time.

The exigencies requiring such a calculation are most commonly encountered in constructing gas meters when these must show at any instant the quantity of gas delivered over a constant period of time (which is 4 hours in France) before the moment of measurement.

I claim:
1. Method of integrating a value which is a variable function of time over a constant floating interval of time, which comprises the steps of transforming the value to be integrated into a succession of signals the frequency of which is at each instant proportional to the magnitude to be integrated, directing said signals to a main memory in the form of a continuous magnetic tape driven by a motor and divisible into a plurality of individual memory units which during a floating interval travel successively past a reading head and a recording head spaced by an interval equal to that separating the same points on two successive memory units, each memory unit being sufficiently short to prevent the recording thereon of more than one signal, recording each of said signals in the memory unit adjacent the recording head, continuously adding the number of signals which are being recorded, detecting the signals recorded in each of the memory units during their travel past the reading head, then erasing these signals while subtracting them from the total of signals recorded, the improvement to which comprises the steps of starting the motor driving the tape by means of a clock which generates control pulses, recording synchronizing pulses successively on the continuous magnetic tape at the beginning of each zone representing a memory unit, detecting the synchronizing pulse recorded on each zone travelling past the reading head, and actuating a two-position delay device upon detection of each synchronizing pulse, so that the signal read by the reading head during the time defined by the to position delay device is subtracted from said total of signals, and the return of the delay device to its normal position stops the motor from driving the magnetic tape until the next control pulse from the clock starts a new cycle.

2. A method as claimed in claim 1 comprising the step of dividing the frequency of said signals by a predetermined constant number before they are stored in said main memory.

3. In a device for integrating a value which is a variable function of time, which device comprises means to transform the magnitude of a value to be integrated into electrical pulses having a frequency proportional to this magnitude, a continuous magnetic tape divisible into a plurality of individual zones, each representing a memory unit, a detector for reading this magnetic tape comprising a reading head, a motor for driving said tape, a recording head and an erasing head disposed between the reading and recording heads, the improvement according to which said device also comprises a clock delivering control pulses at constant intervals of time which controls the motor driving the magnetic tape along the detector, an electronic unit actuated by this clock and comprising an oscillator for producing a train of oscillation to be recorded on the continuous magnetic tape at the beginning of each zone representing a memory unit, the length of said zone being determined by the duration of one operative cycle of the motor, and a two-position delay device controlled by said electronic unit, said delay device having a first position in which it causes the reading of the pulses detected by the detector and being adapted to shift, at the end of a fixed period of time, to a second position in which it causes the stopping of the movement of the magnetic tape.

4. A device as claimed in claim 3 comprising a frequency divider which divides the frequency of the electrical pulses by a predetermined number before they are directed to said main memory.

References Cited
UNITED STATES PATENTS

| | | | |
|---|---|---|---|
| 3,003,696 | 10/1961 | Tullos et al. | 235—183 |
| 3,021,072 | 2/1962 | Robinson | 235—183 |
| 3,404,260 | 10/1968 | Johnson | 235—151.35 |
| 3,407,291 | 10/1968 | Thistle | 235—183 |

MALCOLM A. MORRISON, Primary Examiner

F. D. GRUBER, Assistant Examiner

U.S. Cl. X.R.

235—92, 150.51, 151.35; 307—229; 328—151; 340—174.1